United States Patent [19]

Miyazawa

[11] Patent Number: 5,633,733
[45] Date of Patent: May 27, 1997

[54] ELECTRON FILM VIEWER SYSTEM

[75] Inventor: Azuma Miyazawa, Mitaka, Japan

[73] Assignee: Olympus Optical Co., Ltd., Tokyo, Japan

[21] Appl. No.: 521,186

[22] Filed: Aug. 30, 1995

[30] Foreign Application Priority Data

Sep. 5, 1994 [JP] Japan .................................. 6-211200

[51] Int. Cl.$^6$ ........................................................ G03F 3/10
[52] U.S. Cl. .................... 358/527; 358/487; 358/909.1; 358/450; 358/540; 358/524
[58] Field of Search ........................... 358/527, 540, 358/487, 450, 524, 909.1; 382/216, 214, 213; 354/106, 107; 355/40; 353/25, 26 R, 26 A, 27 A, DIG. 2

[56] References Cited

U.S. PATENT DOCUMENTS

| | | |
|---|---|---|
| 4,805,039 | 2/1989 | Otake et al. . |
| 4,929,971 | 5/1990 | Imura et al. ........................ 358/909.1 |
| 4,935,809 | 6/1990 | Hayashi et al. ....................... 358/527 |
| 4,965,662 | 10/1990 | Shiota .................................. 358/527 |
| 5,101,286 | 3/1992 | Patton .................................. 358/487 |
| 5,103,318 | 4/1992 | Takaoka .............................. 358/444 |
| 5,258,859 | 11/1993 | Wada et al. ....................... 358/909.1 |
| 5,301,026 | 4/1994 | Lee ................................... 358/909.1 |
| 5,317,364 | 5/1994 | Fields ................................... 355/40 |
| 5,420,699 | 5/1995 | Yamanouchi et al. ............... 358/487 |
| 5,477,353 | 12/1995 | Yamasaki ............................ 358/527 |

FOREIGN PATENT DOCUMENTS 3-229368 10/1991 Japan .
4-68877 3/1992 Japan .

*Primary Examiner*—Edward L. Coles, Sr.
*Assistant Examiner*—Fan Lee
*Attorney, Agent, or Firm*—Frishauf, Holtz, Goodman, Langer & Chick

[57] ABSTRACT

The present invention is directed to an electronic film viewer system comprising a cartridge holding section in which a film cartridge is detachably mounted with a processed film loaded therein, a film feed section for feeding a film or a rewinding it, an image inputting section for optically picking up an image from a frame in a frame position to obtain an image signal (image data), a multi-image creating section for storing each frame image data in a multi-image memory section in a way to be assigned to a corresponding one of portion images into which a display image screen is divided, and a switching section for effecting switching to a multi-image area or the image data directly from one frame of the film by an operation section and sending any one to an external display section. The multi-image memory section allows a display of the multi-image area with a storage capacity corresponding to one image area and desired image data can be retrieved and displayed.

18 Claims, 8 Drawing Sheets

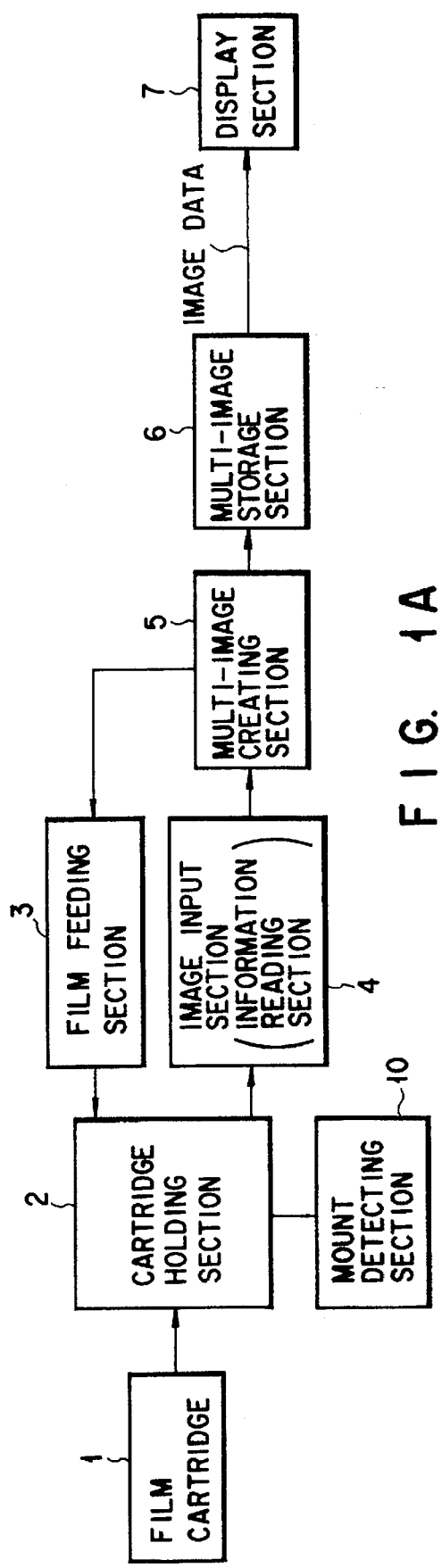
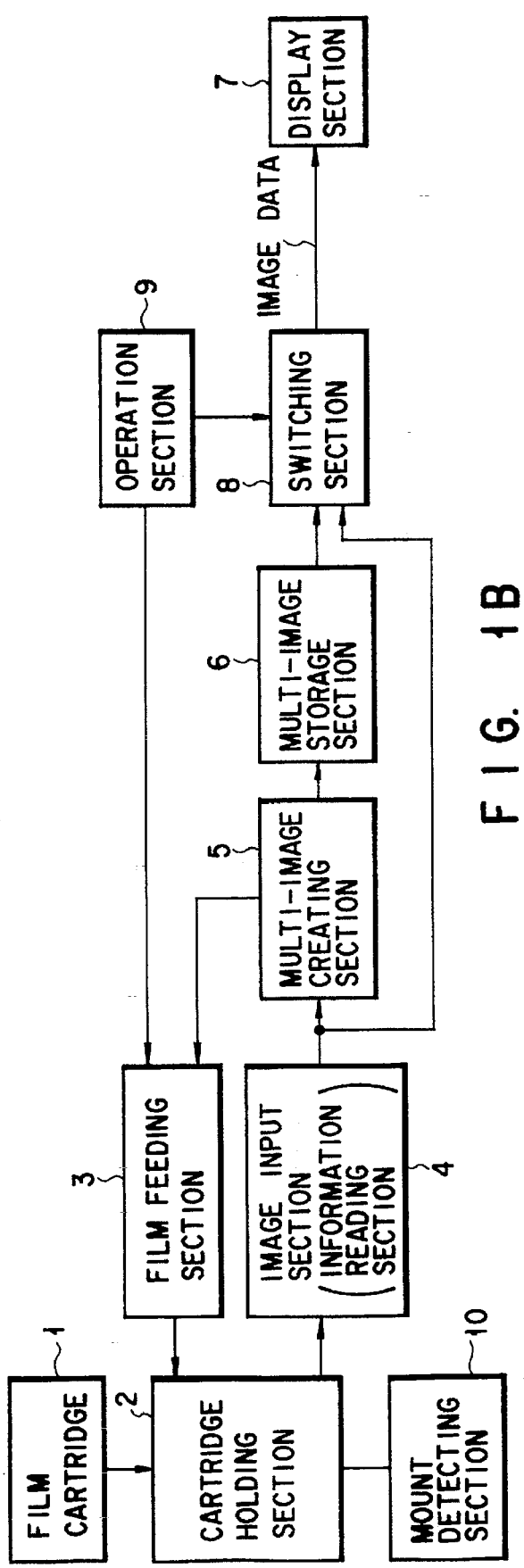
FIG. 1A
FIG. 1B

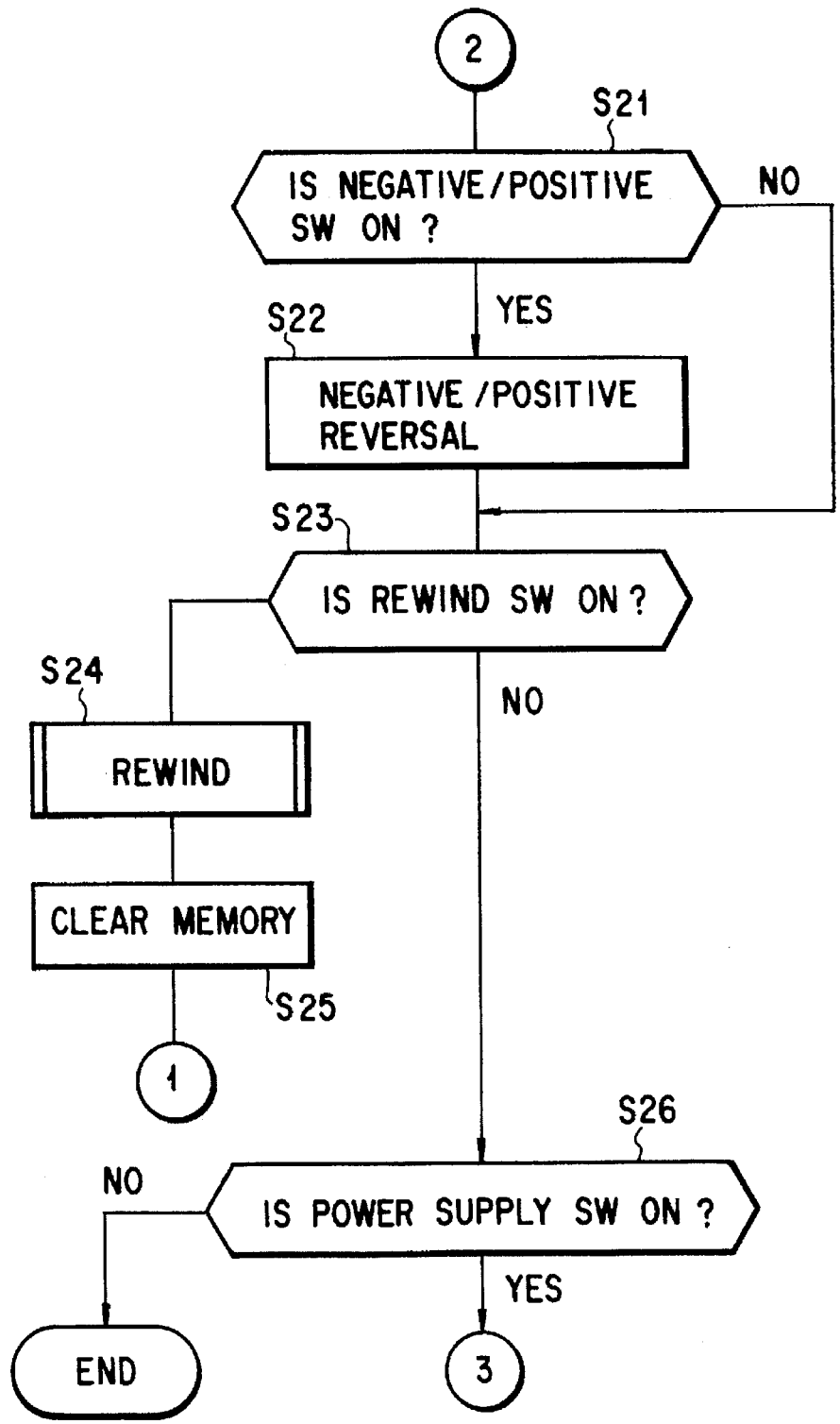
F I G. 7B

ELECTRON FILM VIEWER SYSTEM

BACKGROUND OF THE INVENTION

1. Field of the Invention

The present invention relates to an electronic film viewer system for enabling an image on a processed film which is loaded into a film cartridge to be displayed as a still image on a TV monitor.

2. Description of the Related Art

Conventionally, an electronic film viewer system has been known which is adapted to optically pick up an image on a processed film, photoelectrically convert it to an image signal (still image signal) by an image pickup element, such as a CCD, and display a corresponding image on a TV monitor.

For example, JPN PAT APPLN KOKAI PUBLICATION 4-68877 discloses the technique of picking up an image as image data from a corresponding frame of a film by an image sensor, after being stored in a frame memory, converting it to an image signal and displaying a corresponding image.

JPN PAT APPLN KOKAI PUBLICATION 4-68877, however, simply discloses the technique of enabling an image which is picked up from a corresponding frame of a film to be input, one by one, as an image and display a corresponding image. In this apparatus, it is necessary to ascertain the images by either picking them up, one by one, from the film or visually observing them one by one.

JPN PAT APPLN KOKAI PUBLICATION 3-229368 discloses the technique of storing image data picked up from a film by an image sensor, while displaying the data on a multi-image screen, and retrieving a wanted image from among those display images on the multi-image screen with a plurality of images displayed in divided parts.

In JPN PAT APPLN KOKAI PUBLICATION 3-229368, a description is given of the multi-image screen and not only respective images but also greater numbers of multi-image pictures are stored in memory, thus requiring a vast memory capacity.

A photograph printer device (Type: QSS-1912) manufactured by Noritsu Co., Ltd, includes a multi-image display function in which image data is read out by a scanner and a plurality of such image data (6 frames and 28 frames) are displayed at a time on a display screen so as to confirm correction done before printing.

Even in the photograph printer apparatus above, the multi-image display function is given and the image data corresponding to all frames are stored in memory and a multi-image area is created by selecting a plurality of image data from among image data corresponding to all the frames, so that a large-capacity memory is required and, in addition, a large-scale apparatus is also required.

Generally, a film requested to be processed at a developing station, etc., is cut into frame parts, after being processed, and loaded into a film case and returned back to the user. Proposals has been made in U.S. Pat. No. 5,231,439, etc., to return a film cartridge back to the user with a processed film loaded therein without cutting it into frame parts.

SUMMARY OF THE INVENTION

It is accordingly the object of the present invention to provide an electronic film viewer system which can be achieved, in a simple construction, with less memory capacity and identify the contents of a processed film held in a film cartridge.

According to the present invention, there is provided an electronic film viewer system, equipped with a film cartridge with a processed film loaded therein in a way to have a magnetic track as a magnetic storage medium, for enabling frame images to be optically taken out of the film and displaying a converted image signal on display means, comprising:

film feeding means for feeding the film;

image inputting means for optically taking images out of the film and for converting these images to image data;

information reading means for reading the information on the images recorded on the magnetic track;

image memory means for storing the read image data and information on the image;

multi-image creating means for, when the read image data corresponding to a plurality of frames is stored in the image memory means, performing either one of two, one for dividing a memory area necessary to display one display image area of the display means into a plurality of portions, for sequentially storing each image data corresponding to one frame into the corresponding portion and for creating a multi-image area in the image memory means to allow images corresponding to the plurality of frames to be displayed and the other for creating a multi-image area in a way to have image data below the number of the portions construct the one display image area and for storing the image data in the image memory means at a time; and the display means, including an encode function for creating an image based on the image data stored as a multi-image area in the image memory means, for displaying a plurality of frame images and frame numbers one image screen at a time.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1A is a conceptual view showing an electronic film viewer system of the present invention, and FIG. 1B is a conceptual view similar to that of FIG. 1A;

FIG. 7B is another flow chart associated with that of FIG. 7A;

DETAILED DESCRIPTION OF THE PREFERRED EMBODIMENT

An embodiment of the present invention will be explained below in more detail with reference to the accompanying drawings.

FIGS. 1A and 1B show a conceptual scheme of an electronic film viewer system of the present invention. An explanation of it will be given below.

This electronic film viewer system is comprised of a system for optically picking up an image exposed on a frame of the film and, through the photoelectric conversion of it, displaying it as a still image on a TV monitor, etc.

Figures 2A, 2B:
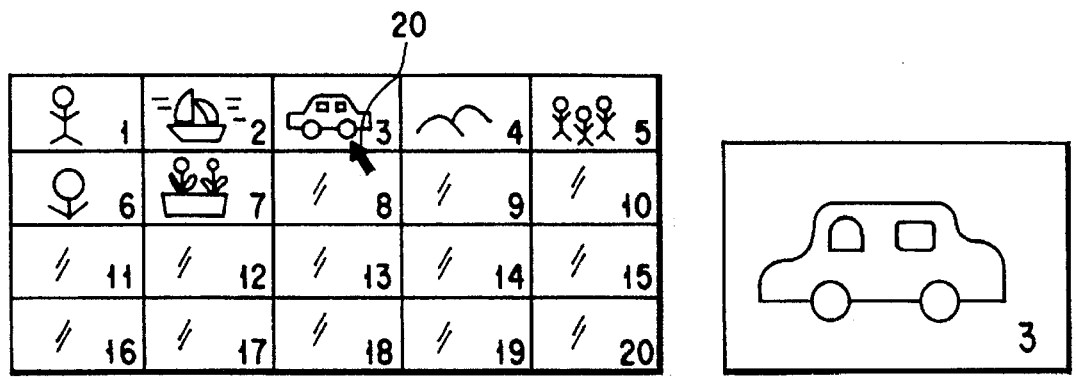
FIG. 2A shows a multi-image area on the system of the present invention.
FIG. 2B shows one frame image selected from the multi-image area.

Here a multi-image area characteristic of the present invention is of such a type as to divide a full image screen into a plurality of (for example, 20) portion images as shown in FIG. 2A, sequentially assign one film-frame image to the respective portion and display the plurality of such portion images at a time on one full image screen. In this case, the frame number, etc., together with the image, is represented on the respective portion image in superimposed form, noting that the frame number corresponds to the frame number attached to the film or a number sequentially entering into a system.

Further, the film of the present embodiment is comprised of a usually employed film or a film having a later-described magnetic track provided along a film perforation area and allowing magnetic recording.

FIG. 2B shows one form of display when, of 20 frames in FIG. 2A, a third frame number image is assigned.

The system as shown in FIG. 1A comprises a film cartridge 1 for holding an uncut, processed film roll therein, a cartridge holding section 2 in which the film cartridge 1 is removably inserted, a film feed section 3 for allowing the film to be pulled from the film cartridge 1 held in the cartridge holding section 2 or to be rewound, an image inputting section 4 for optically picking up an image corresponding to one frame of the film fed from the film feed section 3 and photoelectrically converting it to an image signal (image data) or, in the case of a magnetic track-bearing film, an image inputting section 4 containing an information reading section for reading out a magnetically recorded information, a multi-image creating section 5 for allowing the image data corresponding to one frame to be sequentially assigned to a corresponding one of those portion images, into which one multi-image area is divided, and for creating one multi-image area, a multi-image area storing section 6 for storing at least one multi-image area created, and an insertion detecting section 10 for detecting that the film cartridge 1 is inserted into the cartridge holding section 2.

The multi-image area stored in the multi-image storing section 6 is read out as image signals by a control section, not shown, and displayed on a display section 7 such as an external TV monitor.

The multi-image area creating method by the multi-image creating section 5 comprises completing one multi-image area in the multi-image creating section 5 and storing the multi-image area in the multi-image storing section 6. An alternative method, however, may be adopted according to which a multi-image area is created at the multi-image creating section 5 by storing image data corresponding to one frame in a memory area (address) corresponding to a portion image of the multi-image storing section 6, then image data corresponding to the next one frame, . . . . . sequentially repeating this until all store processing is completed over all of the frames involved. In other words, the difference is whether the multi-image area is created in the multi-image creating section 5 or a multi-image area is created in the multi-image storing section 6.

When, in this system, the film cartridge 1 is mounted in a system body, a film is fed frame by frame, a corresponding image is entered over all the frames involved and a multi-image area is created, and stored, in a way to enable all the image data of all the frames involved to be represented as one screen. When the film cartridge 1 is rewound and taken out, the multi-image area is stored until a new film cartridge is mounted, so that it is possible to identify the images of all the frames of the film at any time. The multi-image area recorded may be erased when a power source of the system body is turned OFF. When the number of frames in the film exceeds the number of divisions in the multi-image area and cannot be identified at one time, a reset switch may be provided at the system body. In this case, the reset switch is forced to be reset and then an image is taken from the next frame so as to create a multi-image area.

Another variant is shown in FIG. 1B.

This variant includes, in addition to the arrangement as shown in FIG. 1A, a switching section 8 for switching one image data taken from a multi-image area stored in a multi-image storing section 6 or from one frame of a film in a film cartridge 1 and sending any image signal to a display section 7 and an operation section 9 for issuing a switching instruction to the switching section 8 and a feed instruction to a film feed section 3 to allow the film to be fed in an amount corresponding to a predetermined frame position.

In the case where a desired image is to be viewed on the structure through the retrieval of image data corresponding to the frames of a film, the multi-image area is read out of the multi-image storing section 6 and, after the image has been identified on the multi-image area, the number of frames (the number of frames set) corresponding to wanted images is designated by the operation section 9. When this is done, the designated frame is film-fed to a predetermined position for picking up the corresponding data by an image inputting section 4 and the image data is output directly on a display section without passing through a memory, etc. That is, the memory needs only a storage capacity capable of storing the multi-image area and less memory capacity can be achieved to deal with that situation above.

Figure 3:
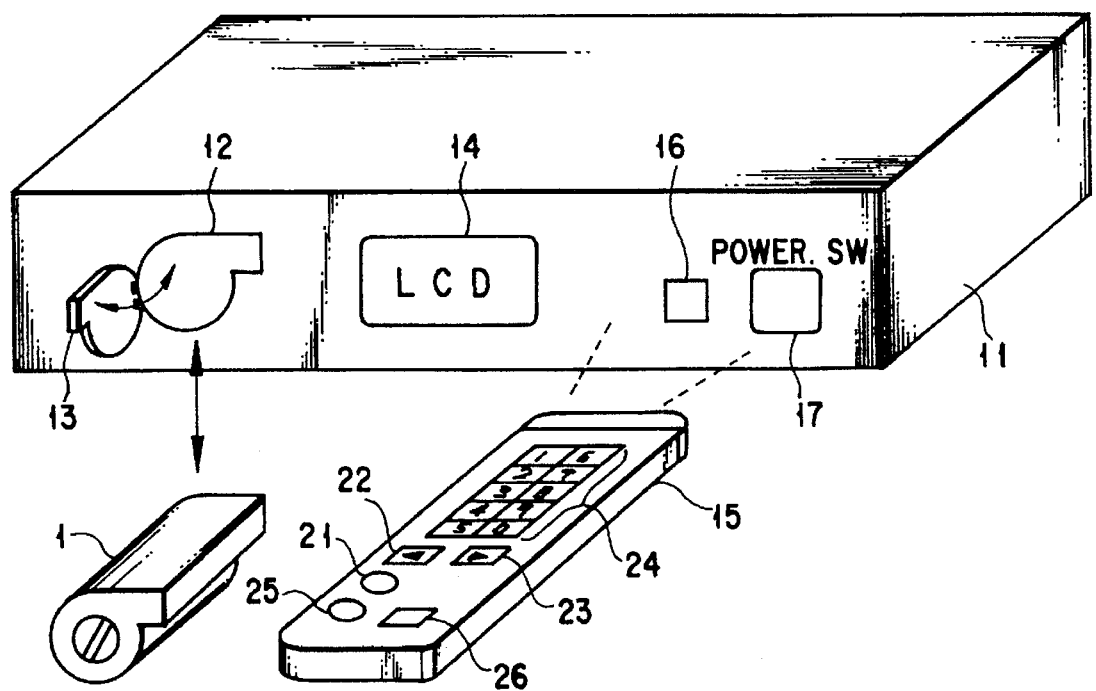
FIG. 3 is a view showing an outer appearance of the electronic film viewer system.

FIG. 3 is a front, perspective view showing an outer appearance of the electronic film viewer system by way of example.

In the electronic film viewer system, a video output terminal is provided on a rear surface side, etc., of a system body, not shown, to deliver, as an output, an image signal as shown in FIGS. 1A and 1B. The video output terminal is connected directly to a TV monitor, etc. A cartridge insertion inlet 12 is provided at the front side of the system body 11 to allow the film cartridge 1 to be inserted. An openable/closable cover 13 is attached to the cartridge insertion inlet 12.

The system body includes an LCD display section 14 for displaying various operation states, etc., an RC SW (remote-controlled switch) light receiving window 16 for receiving light beams corresponding to various control signals coming from remote-controlled switches 15 as will be set out below, and a power supply switch POWER SW 17. In the present embodiment, the RC switches 15 are provided on the RC unit and may be provided directly on the system body instead.

Various switches are provided as RC SWs 15 on the RC unit.

First, these switches comprise a rewind switch 21 for fully storing a film on the film cartridge 1, a feed-back switch 22 for feeding the film backward in an amount corresponding to one frame, a feed switch 23 for feeding the film one frame, frame number designation switches 24 having numbers 0 to 9 and allowing the number of frames involved to be set upon continuous depression, a negative/positive select switch 25 for allowing an input image to be output selectively as a positive or a negative form, and a multi-image changeover switch 26 for switching a display to a multi-image area.

When a number of frames intended are set on the RC unit so arranged, an automatic feed of the film is made until the number of frames involved is all reached. Further, instead of so setting the number of frames, the feed-back switch 22 and feed switch 23 may be depressed continuously to allow the film to be counted down or up, respectively, in units of a frame so that a wanted number of frames are set.

It is to be noted that the setting of a desired frame number is not restricted to the method as set out above and may be achieved by the use of an external inputting device, such as a mouse, in which case a pointer 20 as shown in FIG. 2A is provided in a multi-image area so as to designate the set number of frames thereby.

Figure 4:
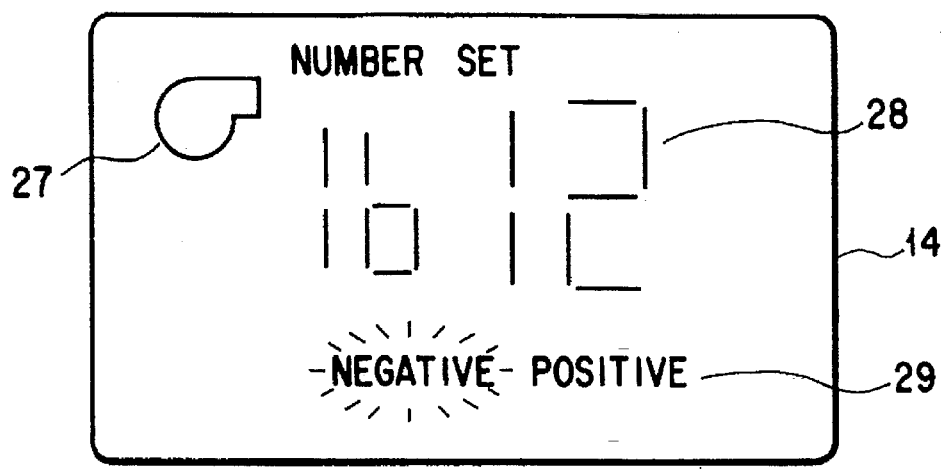
FIG. 4 is a view showing one display form on an LCD display section in FIG. 3.

FIG. 4 shows a practical form of display on the LCD display section 14 shown in FIG. 3.

On the LCD display section 14, a cassette mark display area 27 is flashed on and off, when for example the film cartridge 1 is not inserted, thus prompting the user to insert the film cartridge. The cassette mark display area is lit when the film cartridge is inserted. A frame number display area 28 shows a present number of frames involved (for example, 12). When an intended number of frames is set to be "16" for example, on the RC unit, a "number set" is displayed, together with "16", on the LCD display section.

Then the film is frame-fed toward the number set while varying in its frame number. A negative/positive display area 29 lights a "negative" part when a negative output mode is involved and a "positive" part when a positive output mode is involved.

Figure 5:
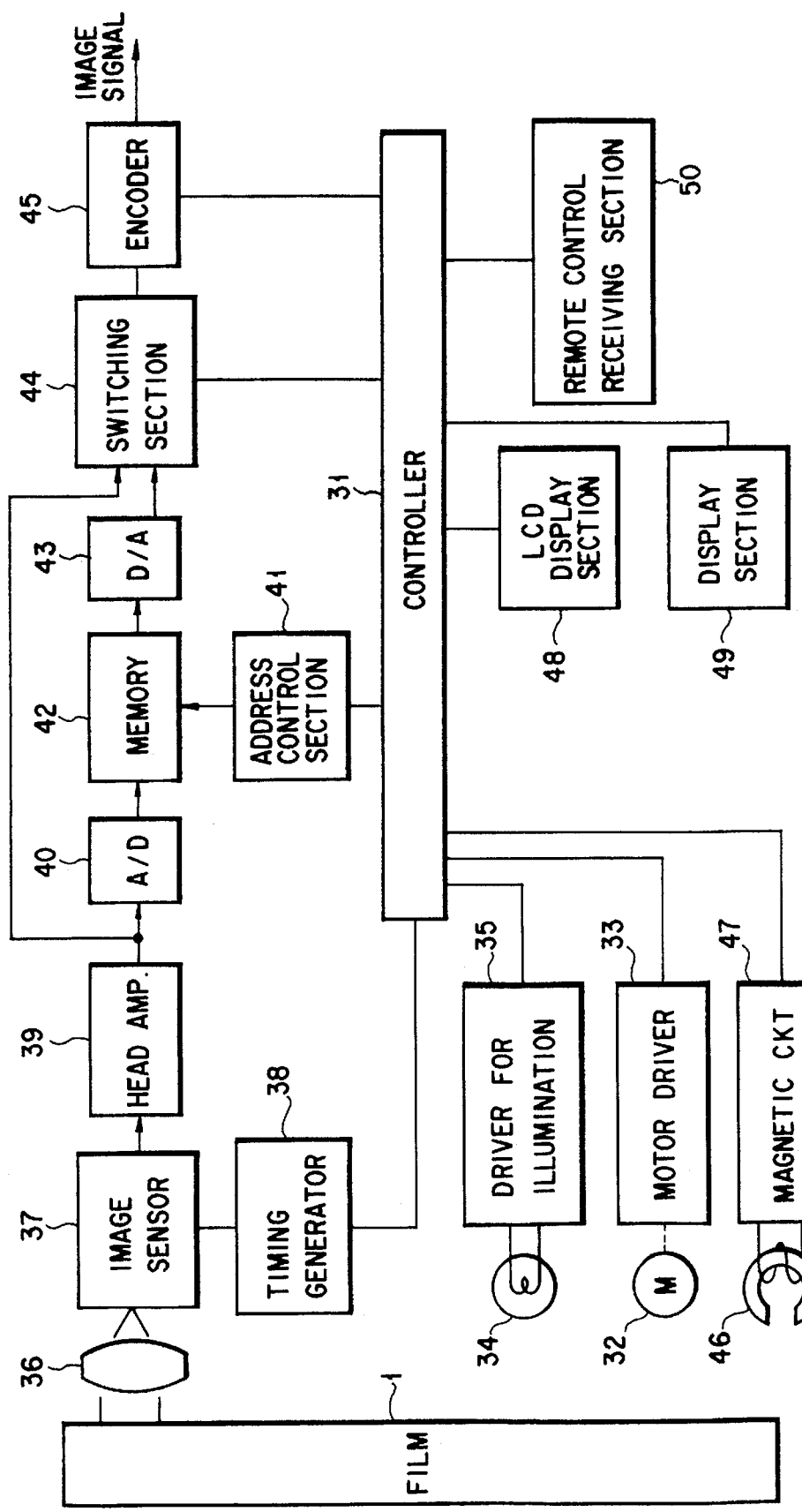
FIG. 5 is a block diagram showing a practical arrangement of the electronic film viewer system.

FIG. 5 shows a practical block diagram showing an electronic film viewer system of the present invention. Here it is assumed that a film used in the present invention has a magnetic track of a magnetic recording medium running along a perforation direction at the edge portion of a photographed frame and recorded with information on a photographed image of each frame.

In the electronic film viewer system, the system as a whole is controlled by a controller 31, such as a microcomputer. The controller 31 may be comprised of a RISC microcomputer or a gate array with periphery blocks incorporated therein.

The electronic film viewer system comprises a motor 32 for enabling a film to be fed from a film cartridge 1 mounted in the system body and then fed to a predetermined position where an image on the frame is taken out, a motor driver 33, a lamp 34 for illuminating the positioned frame with light and a driver 35 for illumination, an optical system 36 for allowing an image which is obtained by the illumination light to be imaged at a sensor surface, an image sensor 37 for creating an image signal from an optical image formed through photoelectronic conversion, a timing generator 38 for driving the image sensor 37 in a predetermined timed relation, a head amplifier 39 for amplifying the image signal created, an A/D converting section 40 for converting the amplified image signal to a digital equivalent and a memory 42 for storing the image signal, in units of one frame image, in an address designated by an address control section 41 controlled by the controller 31.

The designated address represents an area with image data stored therein in units of one frame so as to create the multi-image area as set out above, that is, an area so designated as to complete a multi-image area at a time of completing the storage of all data.

The system of the present embodiment includes a D/A converting section 43 for converting the multi-image area which is read out from the memory 42 to an analog equivalent, a switching section 44 for switching the analog equivalent of the multi-image area or an electronic video signal (image data) corresponding to one frame directly input from the head amplifier 39 and for delivering either one of them, and an encoder 45 for creating an image signal from a selected multi-image area or the image data corresponding to one frame.

By the arrangement, the image signal (image data) created by the image sensor 37 is delivered as an output to an outer display section via either one of two systems as set out in more detail below. One system is of such a type as to send a signal from the head amplifier 39 through a straight route to the encoder 45.

The other system is of such a type that, after being A/D converted, a signal is once stored in the memory 42 and then delivered as a multi-image area to the encoder 45. That is, the signal is so stored as to allow corresponding pixels to be partially cut in a way that it is contained in a corresponding portion image, by the address control, at each frame of the film. The memory is connected to the D/A converting section D/A and, at the time of displaying the multi-image area, the signal is connected by the switching section 44 to the encoder 45 and a corresponding multi-image is delivered as an image signal. From this it will be appreciated that, in the present embodiment, the memory needs only a storage capacity for at least one multi-image area to be stored therein.

The electronic film viewer system of the present embodiment further comprises a magnetic head 46 for recording/reproducing data stored on the magnetic track on the film, a magnetic circuit 47 for supplying/receiving signals from magnetic head 46, a display section 48 for displaying an operation state of the system, a controller 31 having an power supply switch, etc., and an RS SW signal receiving section 50.

Figure 6:
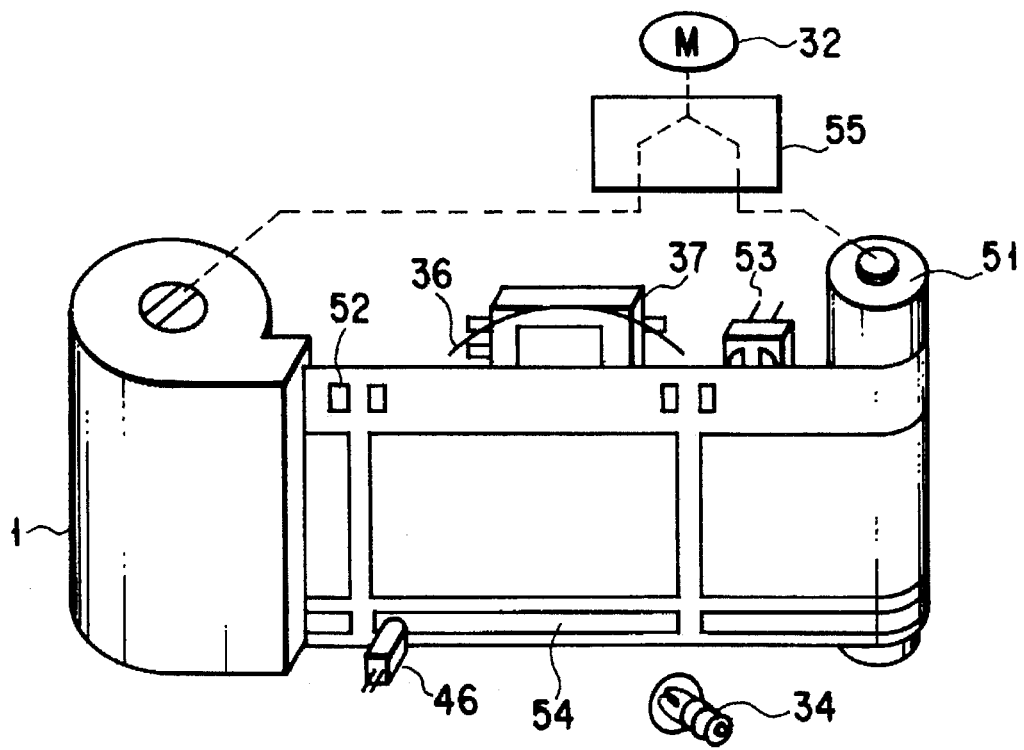
FIG. 6 is a view showing an arrangement for picking up an image from a corresponding film frame and creating an electronic image signal.

FIG. 6 shows an arrangement of an electronic film viewer system which takes an image from a film and, being photoelectrically converted, creates a corresponding image signal. As will be seen from FIG. 6, through the driving of the motor 32, a film pulled from the film cartridge 1 is wound on a spool 51. Between the film cartridge 1 and the spool 51 the lamp 34 is provided on one side for projecting an image of the film and the optical system 36 and image sensor 37 are provided on the other side, the optical system 36 being adapted to allow the image of the film to be formed and the image sensor 37 being adapted to allow the photoelectric conversion of an image. An area sensor is illustrated as one form of the image sensor 37.

In order to obtain a film position, P.R. 53 is provided to detect perforations in the film. A magnetic head 46 is abutted against the magnetic track 54 to allow the recording or reproduction of information on the photographed images. Switching is effected to either of the spool 51 and film cartridge 1 by a motor switching section 55 to allow it to be driven by the motor 32. That is, at the film feeding time, the film cartridge's shaft is rotated by the motor 32 to feed the film and, after the film is wound on the spool 51, switching is effected by the motor switching section 55, so that the "spool" side is rotated to allow the feeding of the film. At the film rewinding time, with the spool 51 in a free state, the film cartridge's shaft is rotated to store the film.

The lamp 34 is lit at the image input time only. With a designated frame positioned at the feeding of the film, the magnetic head is located to a position (cartridge side) where information on the designated frame has already been read out.

Figure 7A:
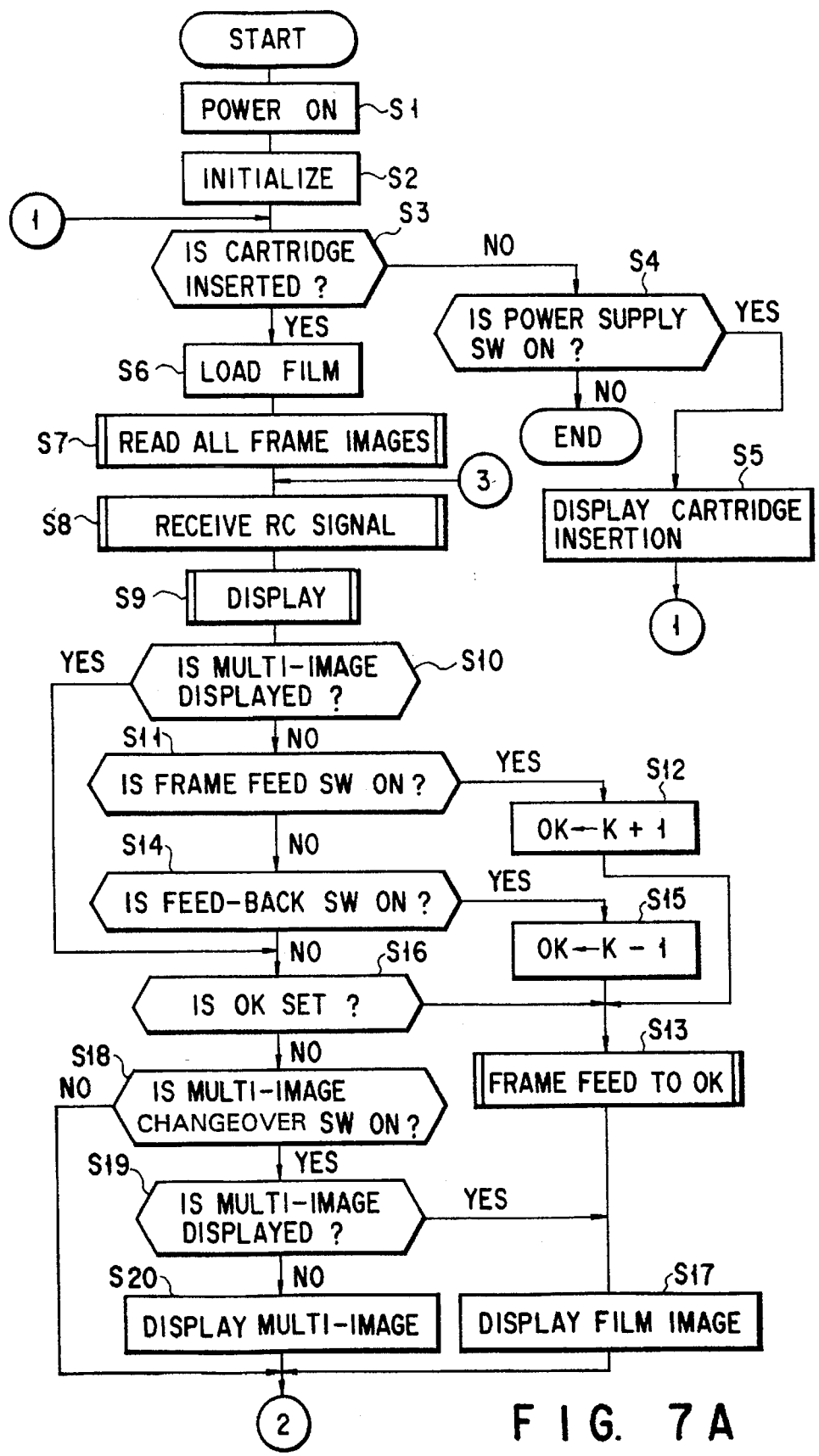
FIG. 7A is a flow chart for explaining an operation of the electronic film viewer system.

The operation of the electronic film viewer system thus constructed will be explained below with reference to FIGS. 7A and 7B.

With the power switch ON (step S1), the system is initialized (step S2). Then checking is made to see whether or not the film cartridge 1 is inserted via the cartridge insertion inlet 12 (step S3). The method of detection may be done by providing a detection switch on a cover 13 at the cartridge insertion inlet 12 or the cartridge itself may be detected directly.

When, at step S3, the film cartridge 1 is not mounted in the system body, a negative answer (NO) is produced. Step S4 checks whether the power supply switch 17 is in an ON or in an OFF state. If the answer is in the negative (NO), this process sequence is ended. If the answer is in the affirmative (YES), the "cartridge not yet inserted" display (the flashing of the cartridge mark) is made at the LCD display section 14 at step S5 so that the system waits for the insertion of the film cartridge 1.

When the film cartridge 1 is inserted (YES) in step S3, a film is loaded at step S6 and a total of frame images is read out as a multi-image area for storage (step S7).

Step S8 checks whether or not a signal is received by the operation of the operation switch on the RC unit. In this connection it is to be noted that, in the case where switches are mounted on the system body side, the operation of the switch is detected in place of receiving the signal at step S8.

Step S9 effects LCD display in accordance with the setting mode and state of the system. Then checking is made at step S10 to see whether or not the multi-image area is displayed on the display screen of an external display section. If the multi-image screen is displayed (YES), the inputting by the film feed switch 23 and film feed-back switch 22 is inhibited. This inhibition is made because it is unclear where the present frame is located on the film in the case of the multi-image screen.

If the multi-image display is not involved (NO), checking is made at step S11 to see whether or not the feed switch 23 is ON (YES), then a number K+1 (K: a present frame number) is substituted in a set frame number 0K at step S12 and the film is fed to reach 0K→K+1 step S13.

Checking is made at step S14 to see whether the feed-back switch 22 is rendered ON or OFF. If the switch is rendered ON (YES), a number K−1 is substituted into 0K to reach 0K→K−1 at step S15 and control is transferred to step S13 where the film is fed to the 0K frame position.

At step S16 checking is made to see whether or not the set frame number is reached by the inputting operation of the frame number designation section. If the answer is in the affirmative (YES), control is transferred to step S13 where the film is reached to the 0K position. Thereafter, the film frame image display is effected at step S17 and control is transferred to step S21. If the set frame number is not reached to the 0K position (NO), checking is made at step S18 to see whether the multi-image area switch is turned ON and OFF. If OFF, that is, NO, control is transferred to steps S21 and if ON, that is, YES, checking is made at step S19 whether or not the multi-image area is displayed. If YES, the film image screen is displayed at step S17 and, if NO, the multi-image area is displayed at step S20.

Then, at step 21 checking is made to see whether the negative/positive switch 25 is rendered ON or OFF. If ON, that is, YES, a negative/positive reversal is effected on the display T image plane at step S22 and, if OFF, that is, NO, checking is made, at step S23, whether the rewind switch 21 is rendered ON or OFF. If the rewind switch is rendered ON (YES), a rewind operation is performed at step S24 and, when the film cartridge 1 is removed from the system, the multi-image area in the memory is cleared at step S25 and control is returned back to step S3. If, at this time, the film is loaded with the film cartridge 1 not removed, the multi-image area can be displayed. It is to be noted that, even if there is no memory clear step present, an automatic update operation is carried out when the next fresh film cartridge 1 is mounted in the system body so that it is not necessary to effect a memory clear operation. Further the memory may be cleared at the time of opening and closing the cover 13 at the cartridge insertion inlet 12.

With the rewind switch OFF (ON) at step S23, checking is made at step S26 whether the power supply switch is rendered ON or OFF and, if ON (YES), control is transferred to step S8 and, if OFF (NO), the sequence process is ended.

Figure 8:
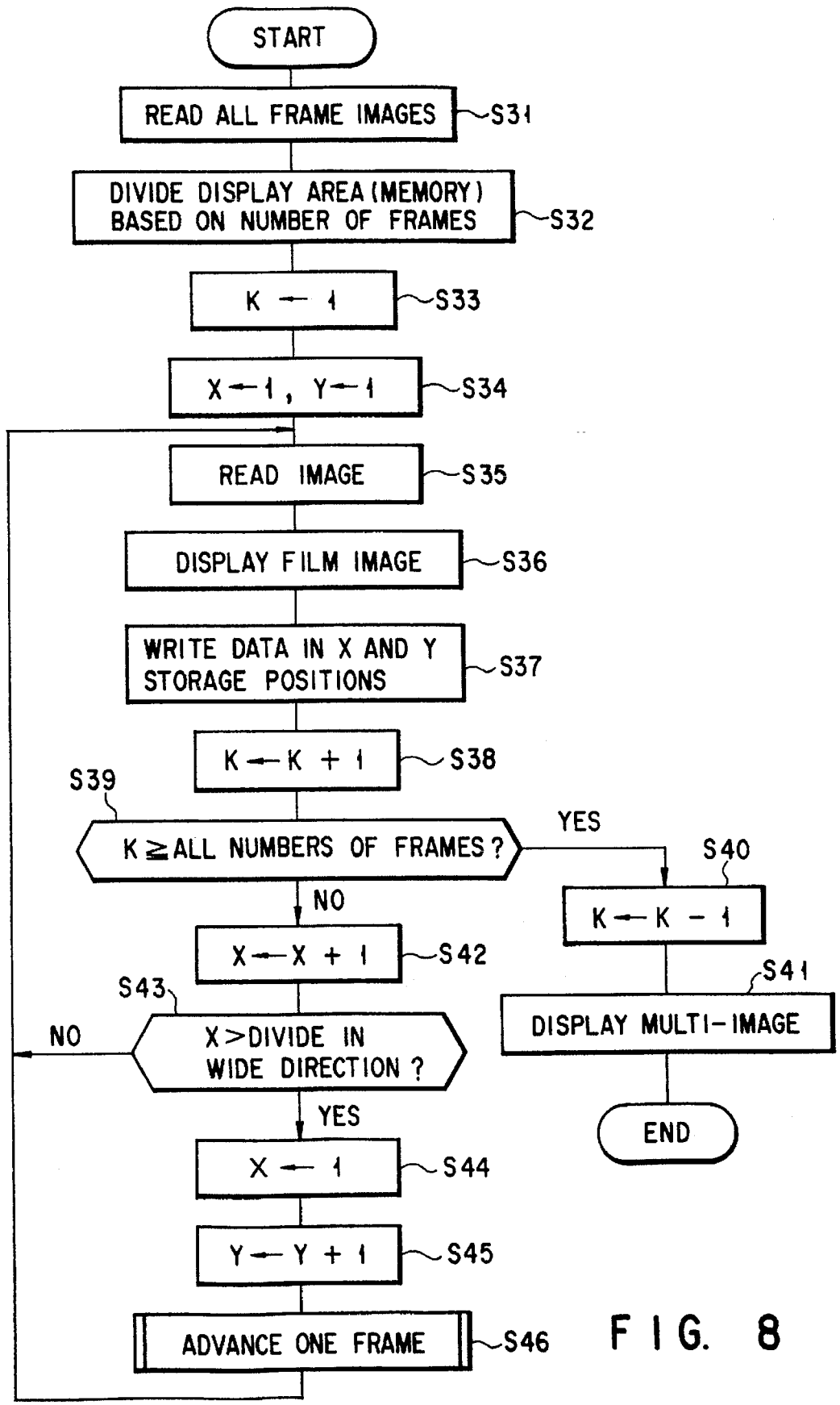
FIG. 8 is a flow chart for explaining the creation of a multi-image area.

The creation of the multi-image area will be explained below with reference to a flow chart shown in FIG. 8.

First, a whole number of film frames are read out at step S31 and, in accordance with the number of film frames, a memory area corresponding to one display image area of the memory is divided into memory areas at step S32. Various forms of division may be considered such as a 15-, a 20- and a 40-division type. These may be considered to correspond to those divided forms of a width dimension × a height dimension, such as 5×3, 5×4 and 8×5 for instance, noting that the number of divisions in the width direction is given as an "X" and that in the height direction as "Y". It may be assumed unavoidable that, since the multi-image area is used strictly as an index function, there occurs a discrepancy in the aspect ratio of a display area per film frame.

Then a coefficient K (numbers of frames) is initialized to "1" at step S33 and the number X and Y, to "1", respectively, at step S34.

Then one-frame image is read out of the film at step S35 and it is, together with the frame number, on the image area on the external display section at step S36. In this connection it is to be noted that, with the created multi-image area displayed, a portion image (division image) together with its frame number is displayed upon being input and, by doing so, all the frame images are ended in input operation and so displayed. If this is the case, then the one-frame image display at S36 may be omitted.

Then image data is written in the memory position K, X, Y at step S37. This write operation is performed by partially cutting associated data under address control. Here the frame number is stored in the memory in a superimposed fashion.

Then the number K is incremented at step S38 and checking is made at step S39 to see whether or not all the frame images are input. If all the frame images complete their input operation (YES), the number K is decremented, at step S40, back to an original number and a created multi-image area is displayed at step S41, ending this sequence process.

If all the image input operations are not ended at step S39 (NO), the number X is incremented at S42 and checking is made to see whether or not the number X exceeds the number of divisions in the width dimension at step S43 and, if the number X does not exceed the number of divisions in the width dimension (NO), control is returned back to step S35. If, however, the number X exceeds the width dimension (YES), the number X is set to 1 at step S44. The number Y is incremented at step S45 and, after the designation of the next memory address, the film is advanced one frame position at step S46 and control is returned back to step S35 and the same operation is repeated.

Figure 9:
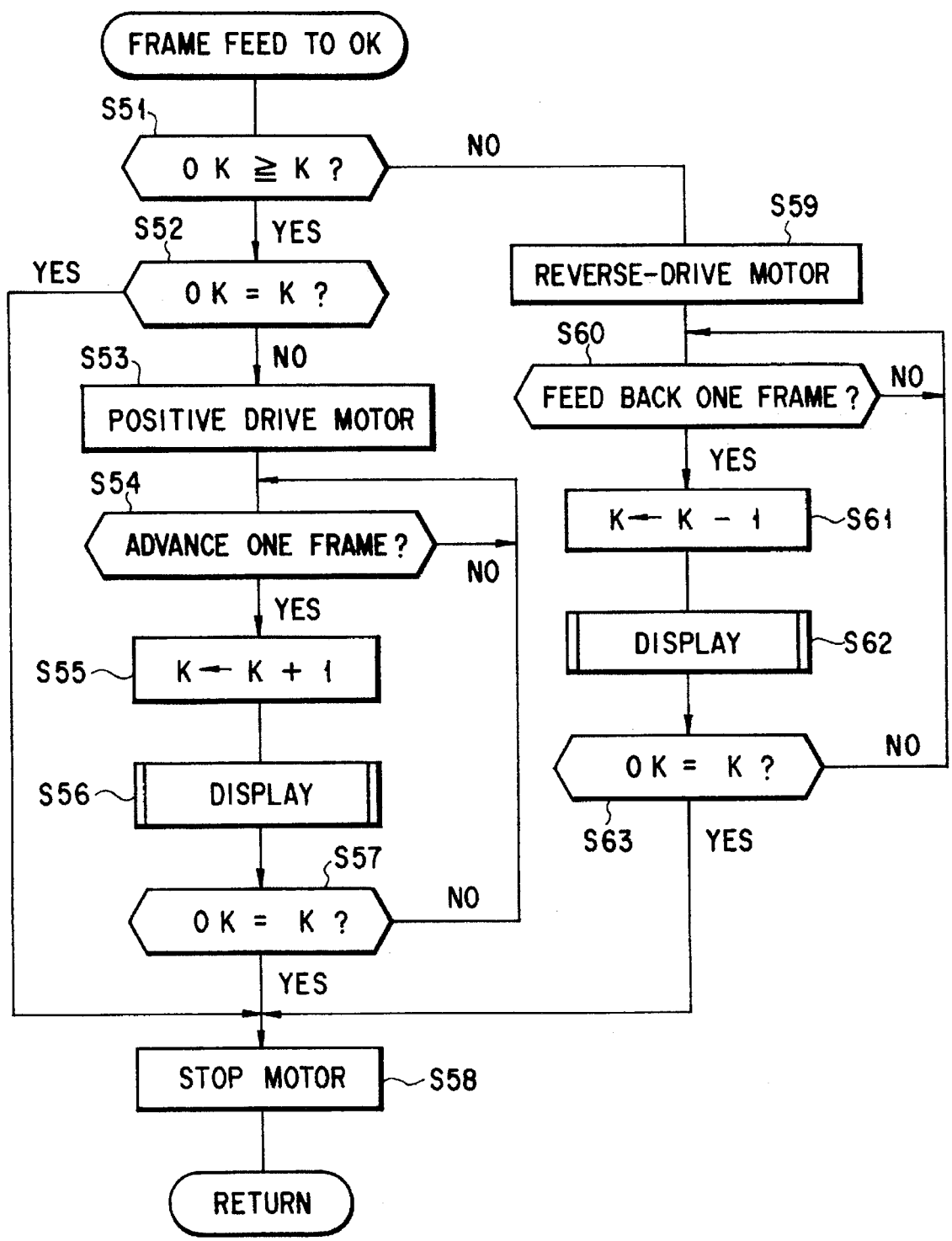
FIG. 9 is a flow chart for explaining a better frame feeding operation.

The 0K frame feed operation will be explained below with reference to the flow chart of FIG. 9.

First, the numbers 0K and K are compared with each other at step S51 and, in the case of 0K≧K (YES), the number of frames set exceeds the present number of frames. In this case, checking is made at step S52 to see whether or not 0K=K. If 0K=K (NO), the motor 32 is positively rotated at step S53 and detected at P.R. 53. At each advance of the film by one frame position (step S54), K→K+1 at step S55. The number of frames is displayed on the display section 48 (LCD display section 14) at step S56. When 0K=K at step S57, the motor is stopped at step S58 and control is returned.

In the case where 0K<K in step S51 (NO), the motor 32 is reverse rotated at step S59. At each movement of the film by one frame at step S60, K→K−1 at step S61 and the number of frames involved is displayed at step S62. When 0K=K at step S63, the motor 32 is stopped at step S58 and the film is fed to the set position.

Although, in the present embodiment, the magnetic track is used to record information on the image, the present invention is not restricted thereto and optical recording may be made on the film.

The electronic film viewer system of the present invention can confirm all the frame image data over the length of the film and, when a desired number of frames are designated, the designated frames are selected so that the display image can be displayed not via the memory.

In the present embodiment, the images are not those read out, once being written in the memory, and there arises less degeneration of the image, thus ensuring a high-quality image. Further, the memory capacity has only to store one multi-image area at least and a proper action can be taken with a memory of less capacity, thus enabling the electronic film viewer system to be achieved in a simpler construction.

The electronic film viewer system as set out above can create a multi-image area one screen at a time as all the frame images of the film and have it stored in the memory. It is possible to confirm all the frame image data throughout the film upon review of one multi-image screen. When a desired number of image frames are designated, then those designated frames are selected and the image data is displayed directly on the image screen without interposing the image memory.

The multi-image screen can be viewed at any time so long as the film cartridge (film) is mounted in the system.

According to the present invention as set out above, an electronic film viewer system is provided which enables a memory to be constructed with a memory capacity of at least one display area and all the contents of "processed" film which are stored in a film cartridge to be confirmed on one image screen.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An electronic film viewer system, equipped with a film cartridge with a processed film loaded therein in a way to have a magnetic track as a magnetic storage medium, for enabling frame images to be optically taken out of the film and displaying a converted image signal on display means, the electronic film viewer system comprising:

film feeding means for feeding the film;

image inputting means for optically taking images out of the film and for converting these images to image data;

information reading means for reading information on the images recorded on the magnetic track;

image memory means for storing the read image data and information on the image;

multi-image creating means for, when the read image data corresponding to a plurality of frames is stored in the image memory means, automatically performing one of the following two operations relating to a multi-image area creation, without external designation or setting by a user:

dividing a memory area necessary to display one display image area of the display means into a plurality of portions, sequentially storing each image data corresponding to one frame into a corresponding portion and automatically creating a multi-image area in the image memory means to allow images corresponding to the plurality of frames to be displayed, and creating a multi-image area in a way to have image data below the number of the portions construct said one display image area and storing the image data in the image memory means at a time; and the display means including an encode function for creating an image based on the image data stored as a multi-image area in the image memory means, for displaying a plurality of frame images and frame numbers one image screen at a time.

2. The electronic film viewer system according to claim 1, further comprising switching means for effecting switching between the multi-image area and one frame image area resulting from an image again read out of the frame of the film responsive to selection of a desired image data of one frame designated in the multi-image area.

3. The electronic film viewer system according to claim 1, further comprising film cartridge mount detecting means for detecting that the film cartridge is mounted in a system body and wherein the image inputting means and information reading means are adapted to, based on a detection signal from the film cartridge mount detecting means, all take the image data from the film and store the image data in the image memory means.

4. The electronic film viewer system according to claim 1, wherein the image memory means holds the image data corresponding to the stored multi-image area until a power supply of a system body is turned off or the film cartridge is replaced by a new one.

5. The electronic film viewer system according to claim 1, further comprising frame designating means for designating a desired frame in the multi-image area to, after the film is fed to a determined frame position, input the image data again coming from the desired frame of the film in the determined frame position to the display means, not via the image memory means, for display.

6. The electronic film viewer system according to claim 5, wherein the frame designating means designates a frame number or a desired frame by a pointer movable in the display image area.

7. The electronic film viewer system according to claim 1, wherein the multi-image creating means is adapted to, when the image data is stored in the image memory means, impart consecutive numbers to the respective image data for frame designation and the display means displays the frame number in the respective frame image in the multi-image area.

8. The electronic film viewer system according to claim 1, wherein the image memory means is provided for storing the multi-image area data in a memory space corresponding to one image area displayed on the display means.

9. The electronic film viewer system according to claim 1, wherein the multi-image creating means is adapted to, upon the creation of the image data for the multi-image area stored in the image memory means, automatically partially cut out pixels, constituting respective images read from the film, and relating to a multi-image area creation, without external designation or setting, so that the respective images are included in the memory area.

10. An electronic film viewer system, equipped with a film cartridge with a processed film loaded therein, for enabling frame images to be optically taken out of the film and displaying a converted image data on display means, the electronic film viewer system comprising:

film feeding means for feeding the film;

image inputting means for optically taking images out of the film and for converting these images to image data;

image memory means for storing the read image data;

multi-image creating means for, when the read image data corresponding to a plurality of frames is stored in the image memory means, automatically performing one of the following two operations relating to a multi-image area creation, without external designation or setting by a user:

dividing a memory area necessary to display one display image-area of the display means into a plurality of portions, sequentially storing each image data corresponding to one frame into a corresponding portion and automatically creating a multi-image area in the image memory means to allow images corresponding to the plurality of frames to be displayed, and creating a multi-image area in a way to have image data below the number of the portions construct said one display image area and for storing the image data in the image memory means at a time; and the display means including an encode function for creating an image based on the image data stored as a multi-image area in the image memory means, for displaying a plurality of frame images and frame numbers one image screen at a time.

11. The electronic film viewer system according to claim 10, further comprising switching means for effecting switching between the multi-image area and one frame image area resulting from an image again read out of the frame of the film responsive to selection of desired image data of one frame designated in the multi-image area.

12. The electronic film viewer system according to claim 10, further comprising film cartridge mount detecting means for detecting that the film cartridge is mounted in a system body and wherein the image inputting means and information reading means are adapted to, based on a detection signal from the film cartridge mount detecting means, take all the image data from the film and store the image data in the image memory means.

13. The electronic film viewer system according to claim 10, wherein the image memory means holds the image data corresponding to the stored multi-image area until a power supply of a system body is turned off or the film cartridge is replaced by a new one.

14. The electronic film viewer system according to claim 10, further comprising frame designating means for designating a desired frame in the multi-image area to, after the film is fed to a determined frame position, input all the image data again coming from the desired frame of the film in the determined frame position to the display means, not via the image memory means, for display.

15. The electronic film viewer system according to claim 14, wherein said frame designating means designates a frame number or a desired frame by a pointer movable in the display image area.

16. The electronic film viewer system according to claim 10, wherein the multi-image creating means is adapted to, when the image data is stored in the image memory means, impart consecutive numbers to the respective image data for frame designation and the display means displays the frame number in the respective frame image in the multi-image area.

17. The electronic film viewer system according to claim 10, wherein the image memory means is provided for storing the multi-image area data in a memory space corresponding to one image area displayed on the display means.

18. The electronic film viewer system according to claim 10, wherein the multi-image creating means is adapted to, upon the creation of the image data for the multi-image area stored in the image memory means, automatically partially cut out pixels, constituting respective images read from the film, and relating to a multi-image area creation, without external designation or setting, so that the respective images are included in the memory area.

* * * * *